United States Patent
Hilyard (10) Patent No.: US 9,503,963 B1
(45) Date of Patent: Nov. 22, 2016

(54) WIRELESS COMMUNICATION SYSTEM TO TRACK DATA RECORDS

(71) Applicant: Sprint Communications Company L.P., Overland Park, KS (US)

(72) Inventor: Trey A. Hilyard, Overland Park, KS (US)

(73) Assignee: Sprint Communications Company L.P, Overland Park, KS (US)

( * ) Notice: Subject to any disclaimer, the term of this patent is extended or adjusted under 35 U.S.C. 154(b) by 7 days.

(21) Appl. No.: 14/447,762

(22) Filed: Jul. 31, 2014

(51) Int. Cl.
*H04W 40/30* (2009.01)

(52) U.S. Cl.
CPC .................................. *H04W 40/30* (2013.01)

(58) Field of Classification Search
CPC ... H04W 40/30; H04W 84/18; H04W 40/00; H04W 40/246; H04W 40/28; H04W 88/16; H04W 4/20; H04W 40/24; H04W 40/26
See application file for complete search history.

(56) References Cited

U.S. PATENT DOCUMENTS

| | | | |
|---|---|---|---|
| 6,584,500 B1 | 6/2003 | Arkko | |
| 6,819,670 B1 | 11/2004 | Fenner | |
| 7,152,060 B2 | 12/2006 | Borthwick et al. | |
| 2005/0171931 A1 | 8/2005 | Baxter et al. | |
| 2011/0007671 A1* | 1/2011 | Yu | H04L 61/6086 370/255 |
| 2013/0194964 A1 | 8/2013 | Basso et al. | |
| 2013/0322268 A1* | 12/2013 | Shaw | H04L 41/5029 370/252 |
| 2014/0064276 A1 | 3/2014 | Basso et al. | |
| 2014/0064281 A1 | 3/2014 | Basso et al. | |

\* cited by examiner

*Primary Examiner* — Curtis A Alia (57) ABSTRACT

A wireless communication network to route data communications. The wireless communication network has wireless access systems and network gateway systems. The wireless access systems and network gateway systems store a plurality of routing instructions to direct the routing of the data communications within the wireless communication network. The wireless access systems and network gateway systems receive user instructions to add data tags to individual ones of the stored routing instructions. The wireless access systems and network gateway systems process the routing instructions to route the data communications. The wireless access systems and network gateway systems count the processing of the routing instructions having the stored data tags. The wireless access systems and network gateway systems transfer data records indicating the counts for the individual routing instructions having the stored data tags for delivery to a routing control system.

20 Claims, 7 Drawing Sheets

WIRELESS COMMUNICATION SYSTEM TO TRACK DATA RECORDS

TECHNICAL BACKGROUND

Wireless communication networks transfer data communications. Wireless communication networks use wireless protocols, such as Long Term Evolution (LTE), Evolution Data Optimized (EVDO), Code Division Multiple Access (CDMA), Global System for Mobile communications (GSM), High Speed Packet Access (HSPA), and the like. Wireless communication networks include various network elements, such as wireless access systems and network gateway systems. Examples of network elements include base stations, access nodes, eNodeBs, Mobility Management Entities (MMEs), Home Subscriber Servers (HSSs), Policy and Charging Rules Functions (PCRFs), Serving Gateways (S-GWs), Packet Data Network (PDN) Gateways (P-GWs), and Internet Multimedia Subsystem (IMS) servers.

Data communications are transferred through wireless communication networks by being forwarded from network element to the network element until the data communications reach their destination. The routing process usually directs forwarding on the basis of databases or routing tables. Network elements have internal and/or external databases containing entries with routing instructions.

For example, setting up a Voice over Internet Protocol (VoIP) call requires routing signaling and messages between various LTE network elements. In a simplified example, a User Equipment (UE) attaches to an eNodeB. The eNodeB transfers the attach request to the appropriate MME. The MME queries the HSS to authenticate the UE. The HSS sends authentication information to the MME. The MME authenticates the UE. The MME also transfers a session request to the S-GW. The S-GW transfers the session request to the appropriate P-GW. The P-GW returns a session response to the S-GW, which forwards the session response to the MME. The MME then transfers a bearer request to the eNodeB. The eNodeB transfers a Radio Resource Connection (RRC) configuration to the UE and sends a bearer accept response to the MME.

OVERVIEW

Examples disclosed herein provide systems, methods, hardware, and software to track data records. In one instance, a method for operating a wireless communication network to track data communications. The wireless communication network has wireless access systems and network gateway systems that route data communications. The method comprises storing a plurality of routing instructions in the wireless access systems and network gateway systems to direct the routing of the data communications within the wireless communication network. The method further provides receiving user instructions to add data tags to individual ones of the routing instructions in the wireless access systems and network gateway systems. The method further includes in the wireless access systems and network gateway systems processing the routing instructions to route the data communications and counting the processing of the routing instructions having the stored data tags. The method also provides the wireless access systems and network gateway systems transferring data records indicating the counts for the individual routing instructions having the stored data tags for delivery to a routing control system.

In another example, a wireless communication system to track data records. The wireless communication system includes a wireless communication network to route data communications. The wireless communication network has wireless access systems and network gateway systems that route data communications. The wireless access systems and network gateway systems store a plurality of routing instructions to direct the routing of the data communications within the wireless communication network. The wireless access systems and network gateway systems receive user instructions to add data tags to individual ones of the stored routing instructions. The wireless access systems and network gateway systems process the routing instructions to route the data communications. The wireless access systems and network gateway systems count the processing of the routing instructions having the stored data tags. The wireless access systems and network gateway systems transfer data records indicating the counts for the individual routing instructions having the stored data tags for delivery to a routing control system.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
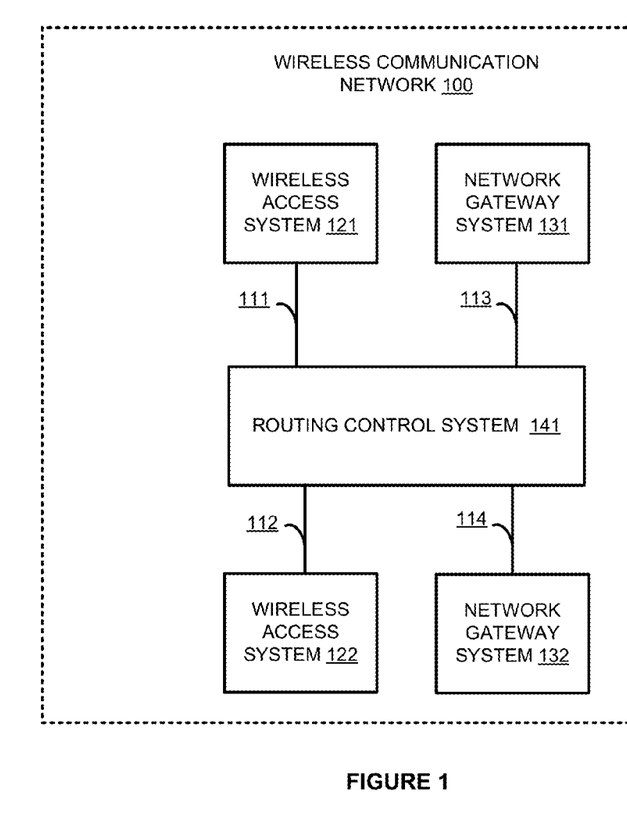
FIG. 1 illustrates a wireless communication system to track data records.

FIG. 1 illustrates wireless communication network 100 to track data records. Wireless communication network 100 includes wireless access systems 121-122, network gateway systems 131-132, and routing control system 141. Wireless access system 121 communicates with routing control system 141 over communication link 111. Wireless access system 122 communicates with routing control system 141 over communication link 112. Network gateway system 131 communicates with routing control system 141 over communication link 113. Network gateway system 132 communicates with routing control system 141 over communication link 114. Although, routing control system 141 is shown external to wireless access systems 121-122 and network gateway systems 131-132, routing control system 141 could be integrated within the components of wireless access systems 121-122 and network gateway systems 131-132.

Examples of wireless communication network 100 include a Long Term Evolution (LTE) network, Evolution Data Optimized (EVDO) network, Code Division Multiple Access (CDMA) network, Global System for Mobile communications (GSM) network, High Speed Packet Access (HSPA) network, Wireless Fidelity (WIFI) network, Worldwide Interoperability for Microwave Access (WiMAX), and the like. Examples of wireless access systems 121-122 include base stations, eNodeBs, Mobility Management Entities (MMEs), Home Subscriber Systems (HSSs), and Policy and Charging Rules Functions (PCRFs). Examples of network gateway system 131-132 include Packet Data Network Gateways (P-GWs), Service Gateways (S-GWs), and Internet Multimedia Subsystem (IMS) servers.

In operation, wireless access systems 121-122 and network gateway systems 131-132 store a plurality of routing instructions to direct the routing of data communications within wireless communication network 100. Examples of data communications include voice calls, data exchanges, web pages, streaming media, text messages, and/or other data communications—including combinations thereof. The routing instructions may be stored in a routing table, database, or other data structure—including combinations thereof. In some examples, wireless communication network 100 may be processing a wireless call between two wireless communication devices. To process the call, wireless communication network 100 uses the databases or routing tables to determine how to route the call. In this example, the databases or routing tables are stored in the network elements. As the call is routed through wireless communication network 100, there will be an entry in the database or routing table of each network element. The entry will provide routing instructions to the next network element or node. In some examples, the plurality of routing instructions are stored in a database or routing table stored in routing system 141 rather than individual routing tables stored in the individual network elements.

Wireless access systems 121-122 and network gateway systems 131-132 receive and store user instructions to add data tags to individual ones of the routing instructions. In some examples, the data tags are bit strings. Although a specified bit string length is not required, a bit string consisting of 8 bits may be used (i.e. an Octet). In some examples, the bit string length may be dynamic. The user instructions may be transferred from routing control system 141 to wireless access systems 121-122 and network gateway systems 131-132. In other examples, the user instructions are transferred directly to wireless access systems 121-122 and network gateway systems 131-132.

Wireless access systems 121-122 and network gateway systems 131-132 process at least some of the routing instructions to route the data communications. Wireless access systems 121-122 and network gateway systems 131-132 count the processing of the individual ones of the routing instructions having the stored data tags. For example, if a routing instruction is tagged, the count will be increased. In some examples, the routing instruction will be stored along with the count information. Although not required, other information, such as time of day, originating number, destination number, or other call information may be stored in addition to the count. In other examples, correlations between routing instructions may also be tracked. In other words, tracking previous and subsequent routing instructions or even the entire network path for the data communications. Wireless access systems 121-122 and network gateway systems 131-132 transfer data records indicating the counts for the individual routing instructions having the stored data tags.

Figure 2:
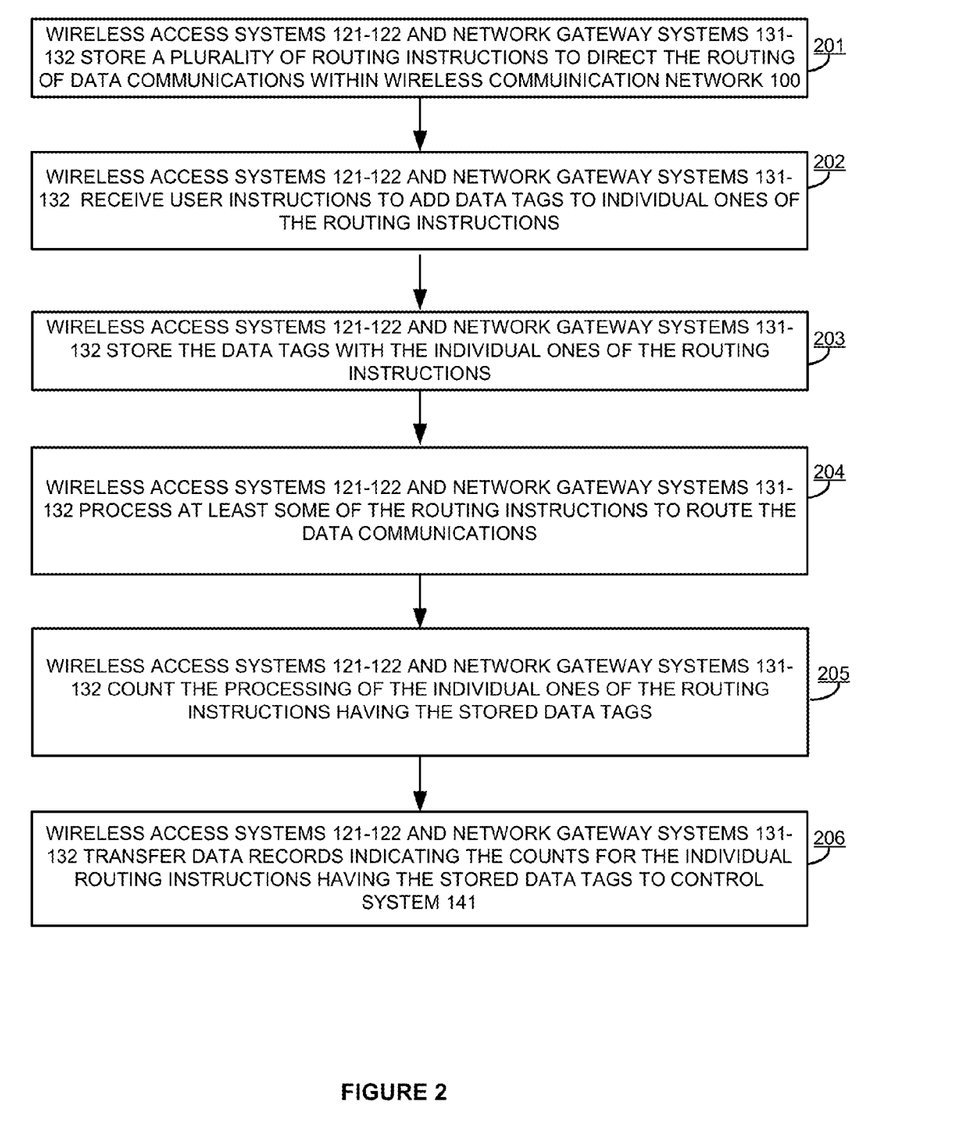
FIG. 2 illustrates the operation of the wireless communication system to track data records.

FIG. 2 illustrates the operation of wireless communication network 100 to track data records. Wireless access systems 121-122 and network gateway systems 131-132 store a plurality of routing instructions to direct the routing of data communications within wireless communication network 100 (201). Wireless access systems 121-122 and network gateway systems 131-132 receive user instructions to add data tags to individual ones of the routing instructions (202). For example, routing system 141 may comprise a mirror database that stores a copy of the routing tables stored in wireless access systems 121-122 and network gateway systems 131-132. The user instructions to add data tags are entered into routing system 141 and then synchronized to the corresponding routing tables in wireless access systems 121-122 and network gateway systems 131-132.

Wireless access systems 121-122 and network gateway systems 131-132 store the data tags with the individual ones of the routing instructions (203). Wireless access systems 121-122 and network gateway systems 131-132 process at least some of the routing instructions to route the data communications (204). Wireless access systems 121-122 and network gateway systems 131-132 count the processing of the individual ones of the routing instructions having the stored data tags (205). Wireless access systems 121-122 and network gateway systems 131-132 transfer data records indicating the counts for the individual routing instructions having the stored data tags (206).

Figure 3:
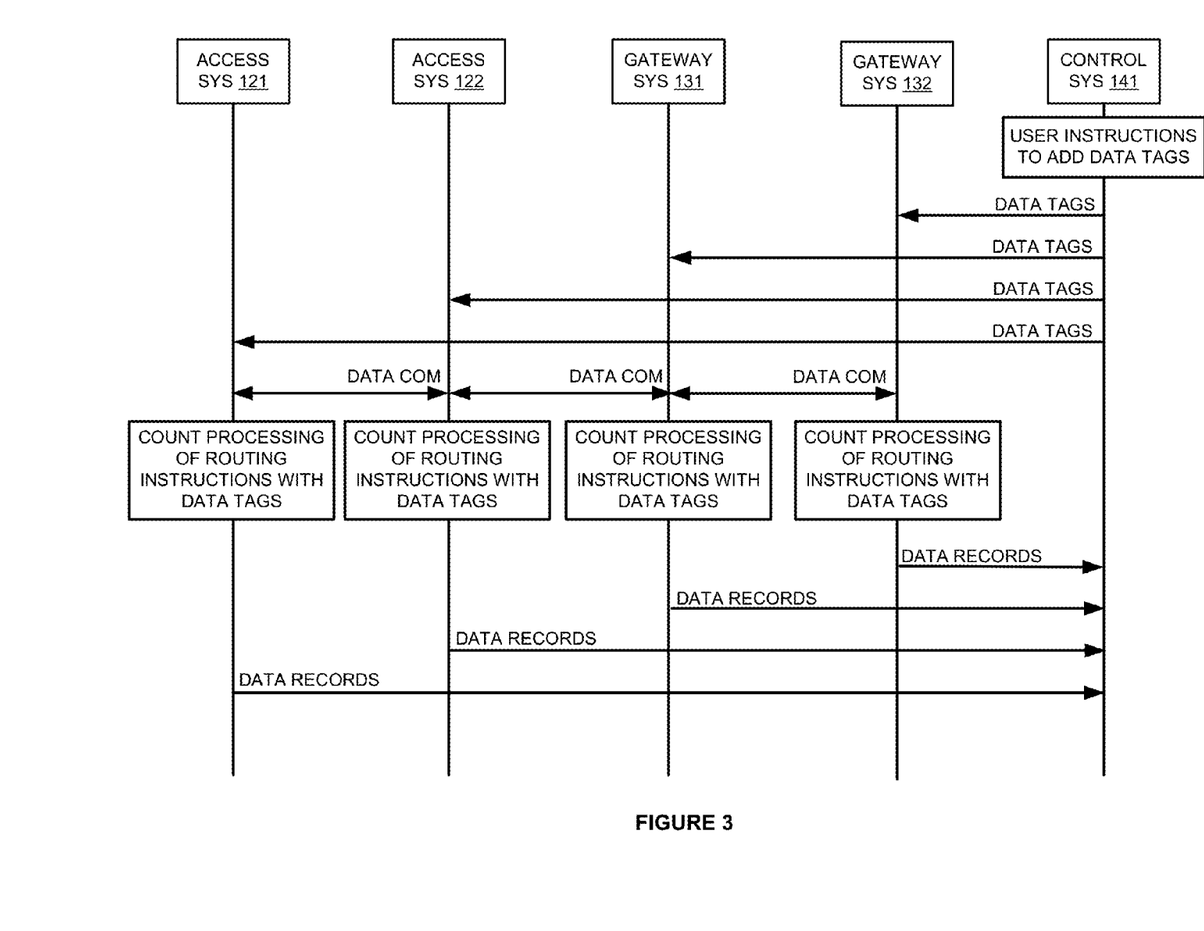
FIG. 3 illustrates the operation of the wireless communication system to track data records.

FIG. 3 illustrates the operation of wireless communication network 100 to track data records. Wireless access systems 121-122 and network gateway systems 131-132 store a plurality of routing instructions to direct the routing of data communications within wireless communication network 100. Wireless access systems 121-122 and network gateway systems 131-132 receive and store user instructions to add data tags to individual ones of the routing instructions. Wireless access systems 121-122 and network gateway systems 131-132 process at least some of the routing instructions to route the data communications.

Wireless access systems 121-122 and network gateway systems 131-132 count the processing of the individual ones of the routing instructions having the stored data tags. For example, wireless access systems 121-122 and network gateway systems 131-132 will count each time an entry or routing instruction is accessed. In some examples, each network element may contain more than on routing table, and the count will track each time a routing table is accessed. In yet other examples, the number of times a network element or resource is accessed is counted. Although not required, wireless access systems 121-122 and network gateway systems 131-132 may also count transitions between the databases/routing tables. Wireless access systems 121-122 and network gateway systems 131-132 transfer data records indicating the counts for the individual routing instructions having the stored data tags.

Figure 4:
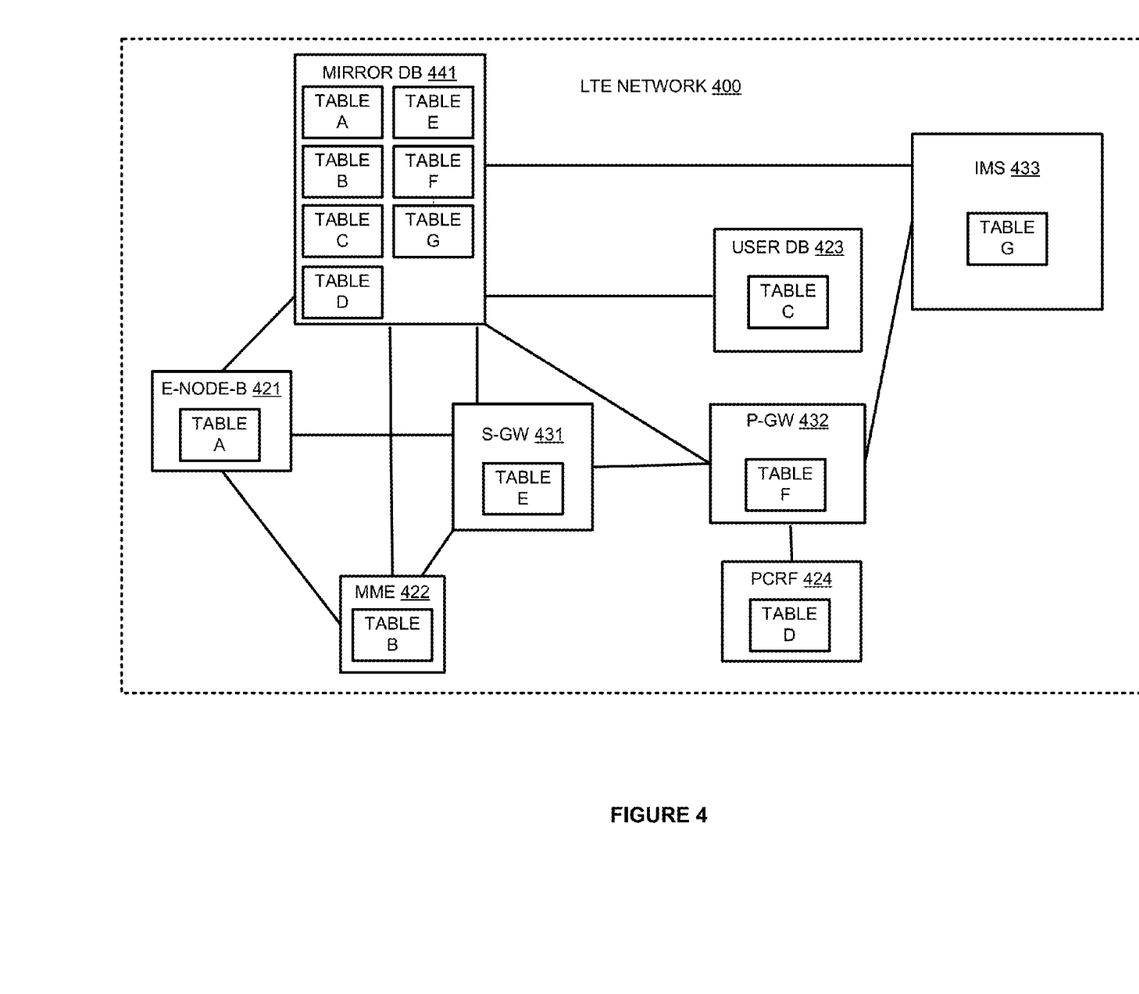
FIG. 4 illustrates a Long Term Evolution (LTE) communication network communication system to track data records.

FIG. 4 illustrates LTE communication network 400 to track data records. LTE network 400 includes eNodeB 421, MME 422, user database (DB) 423, PCRF 424, S-GW 431, P-GW 432, IMS 433, and mirror database (DB) 441. Each network element, eNodeB 421, MME 422, user DB 423, PCRF 424, S-GW 431, P-GW 432, and IMS 433 has a routing table A-G, respectively. Although shown as separate elements, mirror DB 441 may be incorporated in eNodeB 421, MME 422, HSS 423, PCRF 424, S-GW 431, P-GW 432, and IMS 433.

Figure 5:
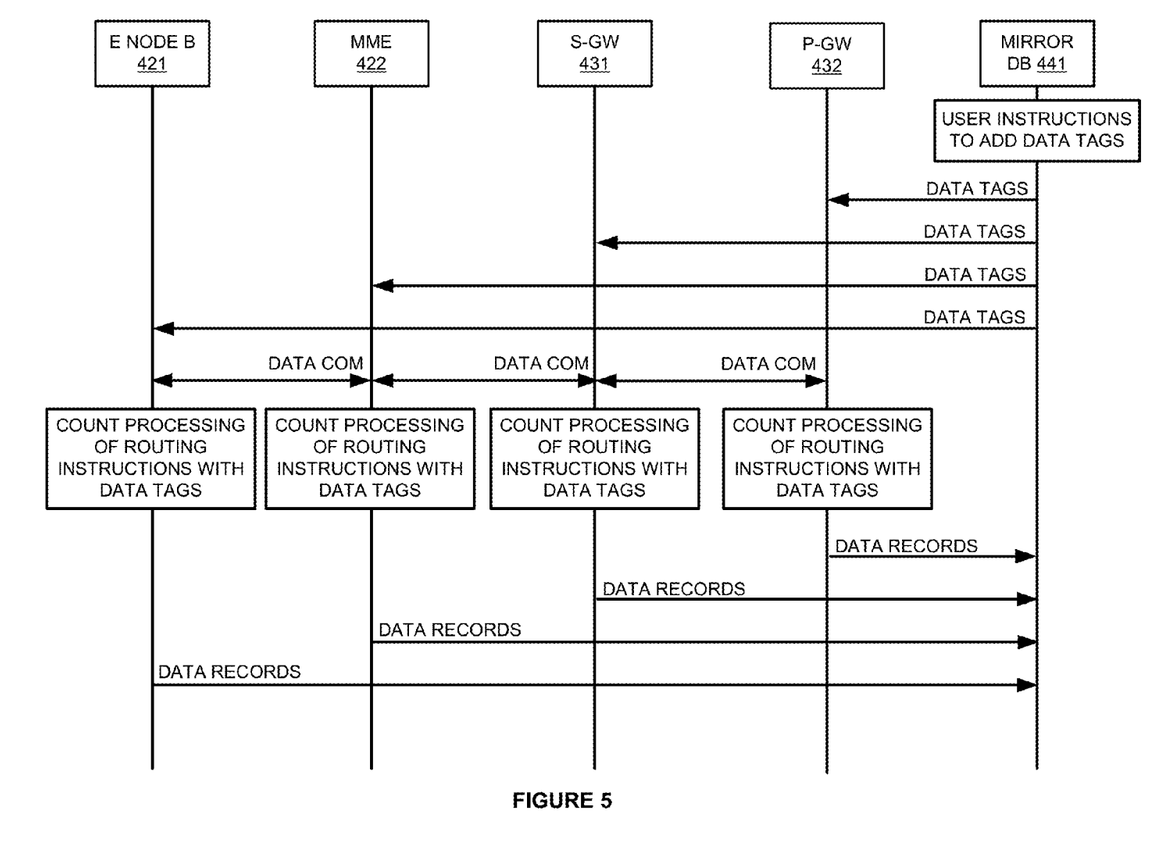
FIG. 5 illustrates the operation of the LTE communication network to track data records.

FIG. 5 illustrates the operation of LTE network 400 to track data records. ENodeB 421, MME 422, S-GW 431, and P-GW 432 store a plurality of routing instructions to direct the routing of data communications within LTE network 400. ENodeB 421, MME 422, S-GW 431, and P-GW 432 receive and store user instructions to add data tags to individual ones of the routing instructions. ENodeB 421, MME 422, S-GW 431, and P-GW 432 process at least some of the routing instructions to route the data communications. ENodeB 421, MME 422, S-GW 431, and P-GW 432 count the processing of the individual ones of the routing instructions having the stored data tags. ENodeB 421, MME 422, S-GW 431, and P-GW 432 transfer data records indicating the counts for the individual routing instructions having the stored data tags.

Figure 6:
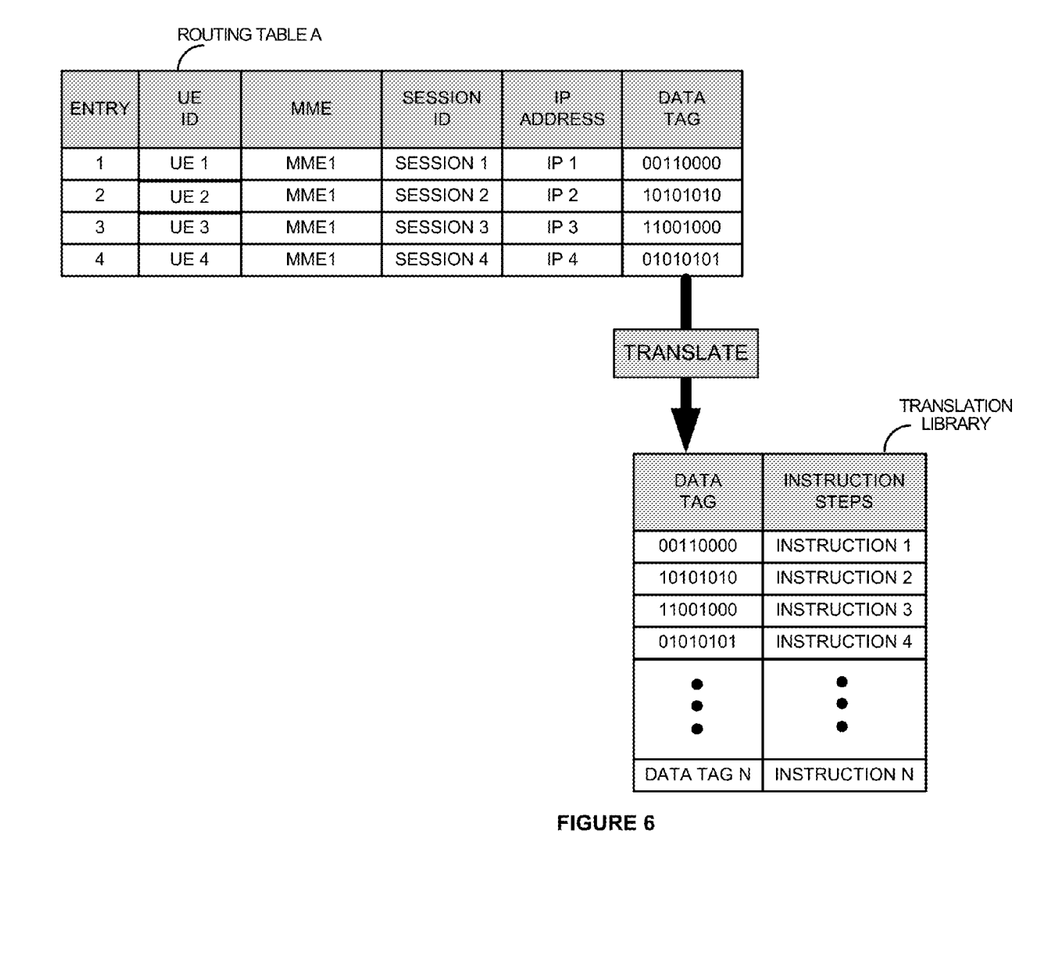
FIG. 6 illustrates an example of a routing table and a translation library to translate the data tags to instruction steps.

FIG. 6 illustrates an example of routing table A and translation library to translate the data tags to instruction steps. In some examples, each database or routing table will contain different information, depending on the network element.

For instance, eNodeB 421 allocates resources to the UE, selects a MME, routes communications to the S-GW, and sends paging messages. Routing table A in eNodeB 421 may include User Equipment (UE) identifier (ID), MME identifier, IP address, paging channel, device location, latency, and/or other information. MME 422 manages UE mobility and routing table B in MME 422 may include UE ID, authentication vectors, device status, idle mode, IP address, Gateway IDs, session ID, paging information, and/or other information. User DB 423 may be a master database of users containing subscription information and routing table C may store UE ID, authentication vectors, authorization information, UE location, IP address, and/or Access Point Names (APNs). PCRF 424 makes real-time policy decisions for each active subscriber and routing table D may include UE ID, Quality of Service (QoS), billing information, policies, and/or other information. S-GW 431 routes packets and routing table E may include UE ID, QoS Class Identifier (QCI), IP address, session ID, and/or other information. P-GW 432 provides connectivity between the UE and an external packet data network such as the Internet. Routing table F in P-GW 432 may include UE ID, IP address, session ID, tunnel information, General Packet Radio Service (GPRS) information, and/or other information. IMS 433 is the framework for delivering IP multimedia services and routing table G may include UE ID, UE IP address, session ID, QoS, VoIP information, registration information, and/or other information.

FIG. 6 also illustrates translation library to translate the data tags into instruction steps. Routing table A includes a first column indicating an entry number, a second column indicating a UE ID, a third column indicating the assigned MME, a fourth column indicating a session ID, a fifth column indicating an IP address for the UE, and a sixth column indicating a data tag. Routing table A is just an example and routing table A may include other information. The values used in FIG. 6 are for illustrative purposes and do not reflect actual values.

In this example, octets are used for the data tags, but bit strings of other lengths may be used. In some examples, each bit may correspond to information such as when to count the routing instruction, when to transmit the data records, where to transmit the data record, what to record, and/or other instructions. In some examples, a translation library may be used to convert the data tags into instruction steps. Although not required, the entire routing instruction may be stored as a bit string with the data tag comprising additional bits added to the bit string. The data tag may be a specified bit length at a specified location in the bit string or may be delimited with a delimiting character or other mark.

Figure 7:
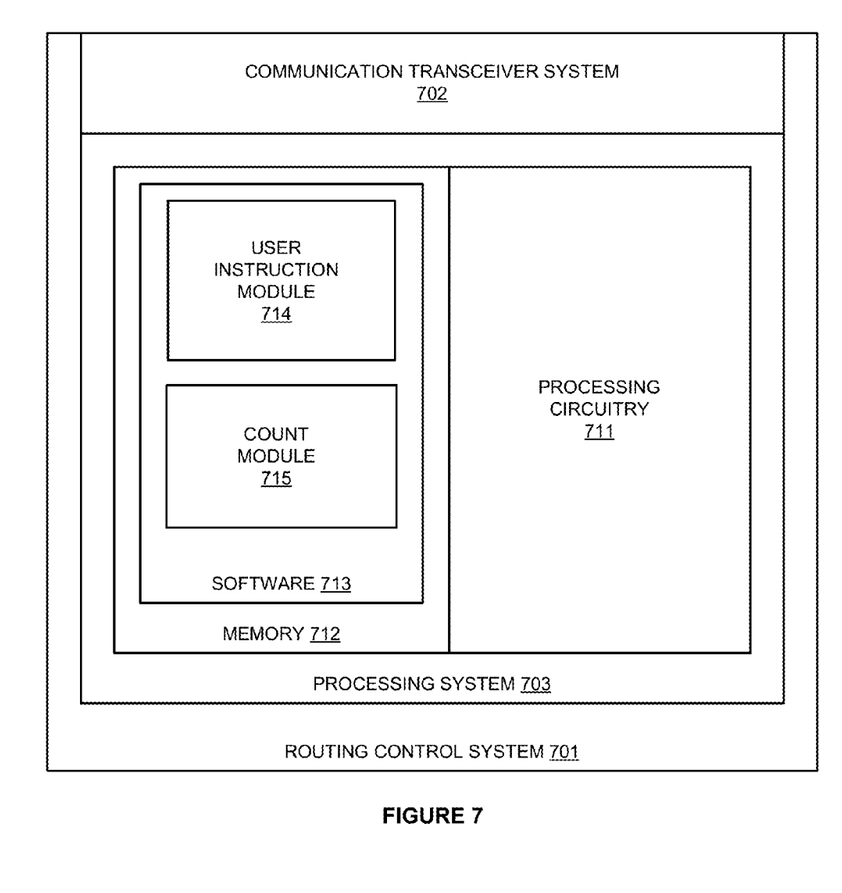
FIG. 7 illustrates an example of a routing control system.

FIG. 7 illustrates routing control system 701. Routing control system 701 is an example of routing control system 141 and mirror database 441, although routing control system 141 and mirror database 441 may use alternative configurations. Routing control system 701 comprises communication transceiver system 702, and processing system 703. Processing system 703 is linked to communication transceiver system 702. Processing system 703 includes processing circuitry 711 and memory 712 that stores operating software 713.

Communication transceiver system 702 comprises components that communicate over communication links, such as network cards, ports, RF transceivers, processing circuitry and software, or some other communication devices. Communication transceiver system 702 may be configured to communicate over metallic, wireless, or optical links. Communication transceiver system 702 may be configured to use TDM, IP, Ethernet, optical networking, wireless protocols, communication signaling, or some other communication format—including combinations thereof.

Processing circuitry 711 comprises microprocessor and other circuitry that retrieves and executes operating software 713 from memory 712. Memory 712 comprises a non-transitory storage medium, such as a disk drive, flash drive, data storage circuitry, or some other memory apparatus. Operating software 713 comprises computer programs, firmware, or some other form of machine-readable processing instructions. Operating software 713 may include an operating system, utilities, drivers, network interfaces, applications, or some other type of software. When executed by processing circuitry 711, operating software 713 directs processing system 703 to operate routing control system 701 as described herein. In particular, user instruction module 714 directs processing system 703 to transfer user instructions to wireless access systems and network gateway systems. Count module 715 directs processing system 703 to receive and process the data records indicating the counts for the individual routing instructions having the stored data tags.

Referring back to FIG. 1, wireless access systems 121-122 and network gateway systems 131-132 comprise RF communication circuitry and an antenna. The RF communication circuitry typically includes an amplifier, filter, RF modulator, and signal processing circuitry. Wireless access systems 121-122 and network gateway systems 131-132 may also comprise a router, server, memory device, software, processing circuitry, cabling, power supply, network communication interface, structural support, or some other communication apparatus. Wireless access systems 121-122 could be a base station, eNodeB, Internet access node, telephony service node, wireless data access point, MME, HSS, PCRF, or some other wireless communication system—including combinations thereof. Network gateway systems 131-132 could be a P-GW, S-GW, IMS server, or other network gateway system—including combinations thereof.

Routing control system 141 comprises a computer system and communication interface. Routing control system 141 may also include other components such as a router, server, data storage system, and power supply. Routing control system 141 may reside in a single device or may be distributed across multiple devices. Routing control system 141 is shown externally to wireless access systems 121-122 and network gateway systems 131-132, but routing control system 141 could be integrated within the components of wireless access systems 121-122 and network gateway systems 131-132. Routing control system 141 could be a mobile switching center, network gateway system, Internet access node, application server, service node, or some other communication system—including combinations thereof.

Communication links 111-114 may use the air, space, metal, glass, or some other material as the transport media. Communication links 111-114 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), Time Division Multiplex (TDM), Internet Protocol (IP), Ethernet, communication signaling, or some other wireless communication format. Communication links 111-114 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network having wireless access systems and network gateway systems that route data communications, the method comprising:
   storing a plurality of routing instructions in the wireless access systems and in the network gateway systems to direct the routing of the data communications within the wireless communication network;
   receiving user instructions to add data tags to individual ones of the routing instructions and storing the data tags with the individual ones of the routing instructions in the wireless access systems and the network gateway systems;
   processing at least some of the routing instructions to route the data communications and counting the processing of the individual ones of the routing instructions having the stored data tags;
   transferring data records indicating the counts for the individual routing instructions having the stored data tags; and
   processing the data records to determine correlations between the individual routing instructions.

2. The method of claim 1 wherein the wireless communication network comprises a Long Term Evolution (LTE) network.

3. The method of claim 1 wherein the wireless access systems comprise Long Term Evolution (LTE) eNodeBs.

4. The method of claim 1 wherein the wireless access systems comprise Long Term Evolution (LTE) Mobility Management Entities (MMEs).

5. The method of claim 1 wherein the wireless access systems comprise Long Term Evolution (LTE) Home Subscriber Systems (HSSs).

6. The method of claim 1 wherein the network gateway systems comprise Long Term Evolution (LTE) Packet Data Network Gateways (P-GWs).

7. The method of claim 1 wherein the network gateway systems comprise Long Term Evolution (LTE) Service Gateways (S-GWs).

8. The method of claim 1 wherein the network gateway systems comprise Internet Multimedia Subsystem (IMS) servers.

9. The method of claim 1 further comprising:
   counting the processing of the individual ones of the routing instructions having the stored data tags on a per-wireless access system and a per-network gateway system basis; and
   transferring the data records indicating the counts for individual ones of the wireless access systems and the network gateway systems.

10. The method of claim 1 wherein the data tags comprise codes and wherein processing at least some of the routing instructions to route the data communications comprises translating the codes to instruction steps.

11. A wireless communication network comprising:
    a data processing system configured to receive user instructions to add data tags to individual ones of a plurality of routing instructions and transferring the data tags with the individual ones of the routing instructions to wireless access systems and network gateway systems for storage; and
    the wireless access systems and the network gateway systems configured to route data communications; store the plurality of routing instructions in wireless access systems and in the network gateway systems to direct the routing of the data communications within the wireless communication network; store the data tags with the individual ones of the routing instructions in the wireless access systems and the network gateway systems;
    the wireless access systems and the network gateway systems configured to process at least some of the routing instructions to route the data communications and count the processing of the individual ones of the routing instructions having the stored data tags; and transfer data records indicating the counts for the individual routing instructions having the stored data tags; and
    the data processing system configured to process the data records to determine correlations between the individual routing instructions.

12. The wireless communication network of claim 11 wherein the wireless communication network comprises a Long Term Evolution (LTE) network.

13. The wireless communication network of claim 11 wherein the wireless access systems comprise Long Term Evolution (LTE) eNodeBs.

14. The method of wireless communication network of claim 11 wherein the wireless access systems comprise Long Term Evolution (LTE) Mobility Management Entities (MMEs).

15. The wireless communication network of claim 11 wherein the wireless access systems comprise Long Term Evolution (LTE) Home Subscriber Systems (HSSs).

16. The wireless communication network of claim 11 wherein the network gateway systems comprise Long Term Evolution (LTE) Packet Data Network Gateways (P-GWs).

17. The wireless communication network of claim 11 wherein the network gateway systems comprise Long Term Evolution (LTE) Service Gateways (S-GWs).

18. The wireless communication network of claim 11 wherein the network gateway systems comprise Internet Multimedia Subsystem (IMS) servers.

19. The wireless communication network of claim 11 further comprising:
- the wireless access systems and the network gateway systems configured to count the processing of the individual ones of the routing instructions having the stored data tags on a per-wireless access system and a per-network gateway system basis; and
- the wireless access systems and the network gateway systems configured to transfer the data records indicating the counts for individual ones of the wireless access systems and the network gateway systems.

20. The wireless communication network of claim 11 wherein the data tags comprise codes and wherein processing at least some of the routing instructions to route the data communications comprises translating the codes to instruction steps.

* * * * *